Dec. 23, 1941.  L. DOTZER  2,267,494
METHOD OF MAKING CANDY
Filed Oct. 16, 1939
Fig.1  Fig.2  Fig.3  Fig.4  Fig.5
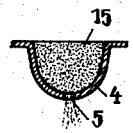 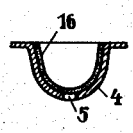 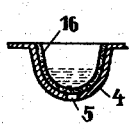 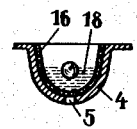 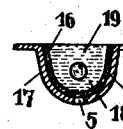
Fig.6
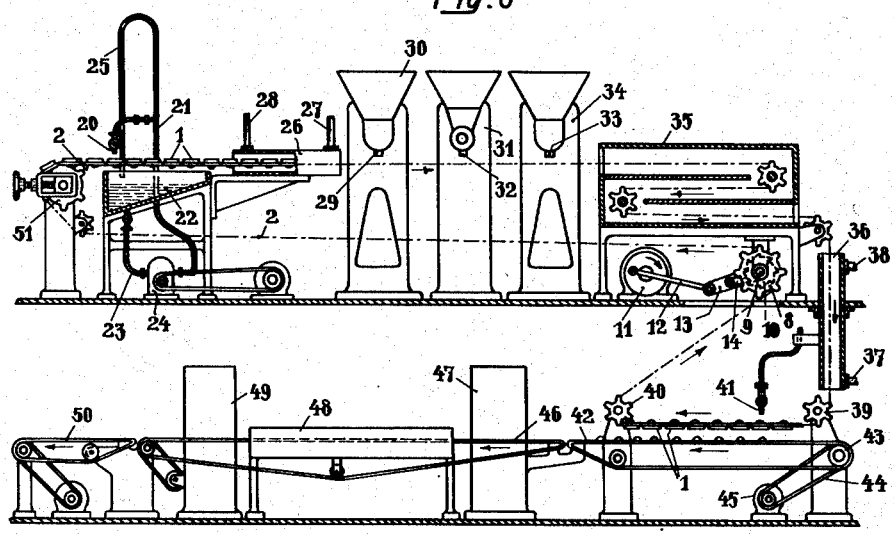
Fig.7
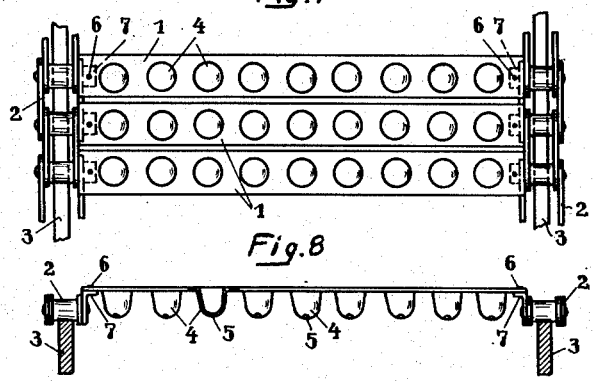
Fig.8
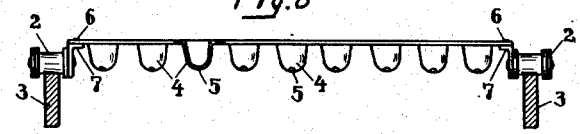

Patented Dec. 23, 1941

2,267,494

UNITED STATES PATENT OFFICE 2,267,494

METHOD OF MAKING CANDY

Leonard Dotzer, Milton, Mass.

Application October 16, 1939, Serial No. 299,746
In Germany October 31, 1938

2 Claims. (Cl. 107—54)

This invention relates to a new and improved method of making candy particularly chocolate covered candies.

As is well known chocolate covered candies particularly those having a semi-fluid center cannot be made in metal molds. This is due to the fact that the mass adheres to the walls of the molds even when such walls are highly polished. As a general rule therefore the filling for such candies is made in boxes filled with powder. It is an object of the invention to eliminate the wastefulness and inconvenience of such a method of production.

Various attempts have been made to use metallic and similar molds for such a purpose. In one method a thin rubber sheet, film or the like has been disposed over the molds and the filling forced together with the sheet into the molds. In this method the rubber sheet being applied against the walls of the molds act as a protective layer and prevent the adherence of the filling to the walls of the molds and also facilitates the ejection of the molded filling. Also in order to assure the application of the rubber sheet or the like to the mold walls the molds have been provided with openings through which the air in the mold has been exhausted. Then by applying air under pressure instead of suction through such openings after the filling has been molded the rubber sheet or the like is easily detached from the walls of the molds and the filling ejected. The disadvantages of such a method are that the rubber sheet is not suitable for long continued operation. Also the apparatus is necessarily very complicated and it has been found from experience that such a method and apparatus is extremely unreliable and not suitable for use with liquid fillings. It is a further object of the invention to eliminate these various disadvantages.

It has also been proposed to use a coating of fat in order to prevent the adherence of the filler to the mold walls by forming an intermediate layer which makes adherence impossible. As a rule this is accomplished by spraying or similar devices which are complicated and require quite complex arrangements. Furthermore the fat so used will affect the flavor of the candy or bonbons. It is a further object of the invention to eliminate these disadvantages by the use of cacao butter instead of a fat or grease. Cacao butter is so nearly related in flavor with the chocolate candy that deleterious influence on the flavor of the candy need not be feared. Also a further advantage resides in the fact that due to the relatively low melting point of the cacao butter the fillings may be easily ejected from the molds. This is accomplished by merely heating it very slightly in order to change the cacao butter from its solid to its fluid state without affecting the solidified filler.

An object of the invention therefore is to use fluid cacao butter in the metal mold so as to secure a thin film coating of cacao butter on the walls of the molds. Thereafter such thin coating is solidified by cooling. Following this step the filling which has been heated into its fluid or semi-fluid state is introduced into the molds and solidified by cooling. Thereafter the thin coating film is softened or liquefied by again briefly heating the mold without affecting the filling so that the latter may be easily ejected.

A further object of the invention is to provide molds having a small central opening at the bottom thereof so that the film of cacao butter may be provided on the mold walls in a simple manner by merely pouring liquid cacao butter into the molds and allowing the same to run through the opening provided in the molds and thereby leave a thin film on the walls. Also such bottom opening may be used later for the application of compressed air to facilitate the ejection of the finished core or filling.

An object of the invention therefore is to provide a method whereby fillings of all types even when of complicated shape may be easily and reliably made in metal molds.

With the above and other objects in view which will become apparent from the detailed description below the invention is shown in the drawing in which;

Figure 1 is a cross sectional view of a single mold filled with cacao butter;

Figure 2 is a similar view of a mold illustrating the thin film of cacao butter after the main portion of the cacao butter has flowed from the mold;

Figure 3 is a similar view of a mold showing a partial filling of the mold with the filling;

Figure 4 is a similar view showing the insertion of a fruit such as a cherry in the filling;

Figure 5 is a similar view illustrating the complete filling of the mold with the filling;

Figure 6 illustrates the apparatus for carrying out the method with such apparatus shown partly in section and partly in elevation;

Figure 7 is a partial plan view of the molds and mold frames; and

Figure 8 is a partial elevational and sectional view of a mold frame.

Referring to the drawing in which like reference characters indicate like parts in the various views the mold frames 1 (see Figure 7) are supported by the endless chains 2. Bars 3 are provided for supporting the chains. The frames 1 are provided with any desired number of individual molds 4 having an opening 5 at their bottom.

The mold frames 1 are secured by means of the pins 6 to the extensions 7 on the chain links so that such mold frames are easily interchangeable or replaceable. The chains 2 are guided over a series of guide rollers (see Figure 6) and are driven by a sprocket wheel 8 which is mounted on a shaft 9. Also mounted on the shaft 9 is a ratchet wheel 10. Upon rotation of the wheel 11 the crank 12 reciprocates and actuates the lever 13, which is rotatable about the shaft 9. A pawl 14 pivoted on the lever 13 cooperates with the teeth of the ratchet wheel 10 so as to intermittently actuate the drive wheel 8.

The steps of the method followed in the invention will now be described with particular reference to Figures 1 to 5.

In Figure 1 the mold is first shown as filled with cacao butter. This cacao butter is allowed to flow through the opening 5 thereby leaving a thin film of cacao butter 16 upon the interior walls of the mold as shown in Figure 2. Then the mold is partially filled with the core or filling 18 as shown in Figure 3. If the filling of the candy is to be homogeneous then the mold may be completely filled at this particular point with the filling. Figure 4 illustrates the insertion of a fruit such as a cherry which is to be embedded in the filling. Then as shown in Figure 5 the mold is completely filled with the filling 18. The above indicates the various steps followed in carrying out the process.

Referring to Figure 6 the apparatus for carrying out such steps will now be described. The molds are first filled from a nozzle 20 or a series of nozzles 20 connected to the conduit 21. The cacao butter 15 is maintained in a fluid state in the heated receptacle 22 and is drawn therefrom through the conduit 23 by the pump 24 and forced upwardly through the conduit 21. By means of suitable control members cooperating with the conduit 21 the discharge of cacao butter can only take place through the nozzle or nozzles 20 when the molds are at rest directly below such nozzles. The pump 24 therefore can be operated continuously and whenever the discharge of cacao butter through the nozzle, or nozzles 20, is prevented such butter may pass through the flow conduit 25 back to the receptacle 22. As is obvious the number of nozzles 20 will depend on the number of molds 4 provided in the mold frames 1.

The excess cacao butter in the molds will flow through the openings 5 back to the receptacle 22 and the molds are in this manner provided with the thin film of cacao butter 16 as shown in Figure 2.

After the molds have been provided with this thin film of cacao butter they move into the cooling chamber 26 to which cooled air is supplied through the conduit 27 and drawn off through the conduit 28. Preferably such cooled air is maintained in constant circulation. In the chamber 26 the film 16 of cacao butter has been cooled to its solid condition.

The molds are then advanced until they are aligned with the nozzle or nozzles 29 where they are partially filled with the filling mass as shown in Figure 3. The filler machine 30 is provided with the requisite number of nozzles 29 and operates in synchronization with the travel of the molds.

The molds are then advanced to the machine 31 with the nozzles 32 where a cherry is introduced into the filling as shown in Figure 4. A further advance of the molds takes them to the machine 34 provided with the nozzles 33 where the filling of the molds is completed as shown in Figure 5.

After the molds have been completely filled in the manner described the chains 2 then advance through a cooling chamber 35 wherein the filling is cooled the desired amount. After leaving the cooling chamber 35 the chains with the filled molds pass through a heating chamber or shaft 36. In this chamber heated air enters through the conduit 37 and is exhausted through the conduit 38. The heated air is preferably maintained in constant circulation and during the passage of the mold through the heating chamber 36 only sufficient heat is applied to the molds as would be necessary to melt the film 16 of cacao butter.

Upon leaving the heating chamber 36 the mold frames 1 are guided by the guide rollers 39 and 40 so as to be inverted with the molds directed downwardly. Upon their intermittent advance the molds 4 have their openings 5 aligned with the ejecting nozzles 41. Compressed air from such nozzles 41 entering the openings 5 eject the fillings from the molds 4 which drop on an endless band or belt 42 which is driven by the roller 43 by means of the belt 44 driven by the motor 45. The fillings are then transferred to a coating grid 46 which passes them through the chocolate coating machine 47. After being coated they pass through the cooling apparatus 48 and if deemed desirable they may be again coated by another coating machine 49 and again cooled in a cooling apparatus not shown. After the fillers have in this manner been suitably coated they are passed to an endless conveyor belt 50 which transfers them to a suitable packing mechanism.

After the mold frames 1 have been emptied of their fillings they are again transferred by the chains 2 and the guide roller 51 to the nozzles 20 and the circuit is again repeated. The guide roller 51 is preferably provided with an adjustable bearing in order to regulate the tension of the chains 2.

The above described method and apparatus is the preferred method and apparatus for carrying out the invention but as is apparent various modifications and changes may be made therein without departing from the scope of the following claims.

I claim:

1. The process of making candy comprising lining a mold with a film of cacao butter, inserting a filler therein, softening said film, ejecting said filler and then coating said filler with chocolate.

2. The process of making candy comprising lining a mold having an opening therein with a film of cacao butter, then solidifying said film, inserting a filler therein, solidifying said filler, softening said film by heat, then removing said filler by compressed air acting through said opening and then coating said filler with chocolate.

LEONARD DOTZER.